United States Patent
Guha et al.

(10) Patent No.: US 9,499,688 B2
(45) Date of Patent: Nov. 22, 2016

(54) LONG FIBER THERMOPLASTIC FORMED WITH RECYCLED AND RENEWABLE CONTENT

(71) Applicant: CONTINENTAL STRUCTURAL PLASTICS, INC., Auburn Hills, MI (US)

(72) Inventors: Probir Kumar Guha, Troy, MI (US); Michael J. Siwajek, Rochester Hills, MI (US); Swati Neogi, East Brunswick, NJ (US)

(73) Assignee: CONTINENTAL STRUCTURAL PLASTICS, INC., Auburn Hills, MI (US)

( * ) Notice: Subject to any disclaimer, the term of this patent is extended or adjusted under 35 U.S.C. 154(b) by 100 days.

(21) Appl. No.: 14/370,570

(22) PCT Filed: Jan. 7, 2013

(86) PCT No.: PCT/US2013/020599
§ 371 (c)(1),
(2) Date: Jul. 3, 2014

(87) PCT Pub. No.: WO2013/103999
PCT Pub. Date: Jul. 11, 2013

(65) Prior Publication Data
US 2014/0343197 A1    Nov. 20, 2014

Related U.S. Application Data

(60) Provisional application No. 61/583,808, filed on Jan. 6, 2012.

(51) Int. Cl.
| | |
|---|---|
| *C08L 23/12* | (2006.01) |
| *B29B 7/40* | (2006.01) |
| *B29B 7/46* | (2006.01) |
| *B29B 7/74* | (2006.01) |
| *C08J 5/04* | (2006.01) |

(Continued)

(52) U.S. Cl.
CPC .............. *C08L 23/12* (2013.01); *B29B 7/40* (2013.01); *B29B 7/46* (2013.01); *B29B 7/7485* (2013.01);
(Continued)

(58) Field of Classification Search
CPC ...................................... C08L 23/12
See application file for complete search history.

(56) References Cited

U.S. PATENT DOCUMENTS 4,863,995 A * 9/1989 Murakami ............. C08L 23/10
                                                                525/207
6,068,934 A * 5/2000 Vandekerckhove .... B29C 33/68
                                                                264/130

(Continued)

FOREIGN PATENT DOCUMENTS

| EP | 0360171 A2 | 3/1990 |
| KR | 1020050017280 A | 2/2005 |
| WO | 2009009207 A2 | 1/2009 |

*Primary Examiner* — Ling Choi
*Assistant Examiner* — Lanee Reuther
(74) *Attorney, Agent, or Firm* — Avery N. Goldstein; Blue Filament Law, PLLC

(57) ABSTRACT

A molding composition formulation is provided that includes polypropylene, glass fiber, and a polypropylene substitute including recycled sheet molding composition transfer film. The polypropylene substitute is present from 1 to 35 total weight percent also may include natural cellulosic fibers or powders. A process is provided by which the polypropylene substitute is mixed and homogenized and then mixed with polypropylene and additives, and thereafter glass fiber. A reduction in the amount of virgin polypropylene used is reduced compared to conventional thermoplastic glass fiber filled moldings.

13 Claims, 2 Drawing Sheets

(51) Int. Cl.
    *B29C 47/36*        (2006.01)
(52) U.S. Cl.
    CPC ............. *B29C 47/366* (2013.01); *C08J 5/043* (2013.01); *C08J 5/045* (2013.01); *C08J 2323/12* (2013.01); *C08L 2205/025* (2013.01); *C08L 2205/035* (2013.01); *C08L 2205/16* (2013.01); *C08L 2207/20* (2013.01)

(56) References Cited

U.S. PATENT DOCUMENTS

| | | |
|---|---|---|
| 2001/0018118 A1 | 8/2001 | Muzzy et al. |
| 2003/0087973 A1 | 5/2003 | Muzzy |
| 2005/0009960 A1* | 1/2005 | Ton-That .............. C08F 255/00 524/27 |

* cited by examiner

LONG FIBER THERMOPLASTIC FORMED WITH RECYCLED AND RENEWABLE CONTENT

RELATED APPLICATIONS

This application claims priority benefit of U.S. Provisional Application Ser. No. 61/583,808; filed 6 Jan. 2012; the contents of which are hereby incorporated by reference.

FIELD OF THE INVENTION

The present invention in general relates to thermoplastic molding compositions and in particular to compression moldable long fiber thermoplastics formed with recycled and renewable content.

BACKGROUND OF THE INVENTION

Polypropylene (PP) is a thermoplastic polymer used in a wide variety of applications including packaging, textiles, plastic parts and reusable containers of various types, laboratory equipment, and automotive components. Thermoplastic moldable articles containing reinforcing fibers, and in particular glass fibers are used with ever increasing frequency for the production of moldings. For applications such as automotive parts, the strength associated with fiber reinforcement, low density, and throughput of thermoplastic molding make these materials attractive options. The high strength and toughness of such articles offer numerous advantages relative to traditional steel stampings. Such articles are produced by combining glass fiber strand and molten thermoplastic films in a double band press or twin screw extruder. Polypropylene is routinely used as the thermoplastic polymer for such article moldings. Owing to the surface finish requirements and often the requirement that the article such an automotive part receive a uniform paint layer, virgin PP is commonly used in such moldings. As virgin PP availability and pricing is tied to volatile petroleum prices, this introduces and element of uncertainty on the cost of such moldings and is also environmentally disfavored as being tied directly to the usage of non-renewable petroleum resources. As a result of the comparatively high cost of PP, many applications that would benefit from such moldings are not viable owing the cost of virgin PP relative to competitive materials such as steel and sheet molding compositions (SMC).

While efforts have been made to use a portion of recycled PP to reduce the cost of fiber reinforced thermoplastic moldings, these efforts have met with limited success owing to the non-uniformity of the recycled PP used as well the in homogeneities associated with differential melt properties between the virgin and recycled PP. Efforts to add fillers to displace PP from a molding composition have also proven unsuccessful owing to the difficulty of hydrophobic PP poorly wetting fillers such as calcium carbonate or carbon black and indeed many types of glass fibers thereby compromising the strength of the resulting article. Natural fibers have been examined to replace principally glass in such molding, but these attempts have come at the expense of overall article strength. Matrix or fiber modification has been considered to be necessary to improve the compatibility between natural fiber and matrix. Maleated polyolefins are used to modify the matrix. Such modification of the matrix develops the interactions between the anhydride groups of maleated coupling agents and the hydroxyl groups of natural fibers. For the purpose of making engineering parts with a wide study on the effect of different coupling agents, such as silanes, maleic anhydride grafted polypropylene (PPgMA) or modification by acetylation, has been reported in the literature. R. Malkapuram et al., J. of Reinforced Plastics and Composites, Vol. 28, No. 10/2009, p. 1169. The difficulty of drying natural fibers and surface modification of the natural fibers adds considerable cost and variability to PP fiber filled moldings and cannot replace glass fiber or carbon fiber reinforcements in PP moldings without compromising article strength.

Additionally, as long flow direction of molten, glass fiber filled PP tends to orient the internal fibers, a reduction in article strength in the direction parallel to melt flow is typically noted, with the problem being exasperated by inclusion of particulate fillers or natural fiber fillers.

Thus, there exists a need for a compression moldable thermoplastic that includes a reduced volume of PP while still affording the strength associated with full loadings of glass fiber reinforced, virgin PP. There further exists a need for such a composition that includes recycled material to reduce the environmental footprint of such moldings.

SUMMARY OF THE INVENTION

A molding composition formulation is provided that includes polypropylene, glass fiber, and a polypropylene substitute including recycled sheet molding composition transfer film. The polypropylene substitute is present from 1 to 35 total weight percent also may include natural cellulosic fibers or powders. A process is provided by which the polypropylene substitute is mixed and homogenized and then mixed with polypropylene and additives, and thereafter glass fiber. A reduction in the amount of virgin polypropylene used is reduced compared to conventional thermoplastic glass fiber filled moldings.

BRIEF DESCRIPTION OF THE DRAWINGS

The present is further detailed with respect to the following drawings. These figures should not be construed as limiting the scope of the invention to the exemplary embodiment depicted in FIG. 2, but rather to illustrate aspects of the invention and the usage thereof in molding.

DESCRIPTION OF THE INVENTION

The present invention has utility as an economical and environmentally friendly substitute for lowering polypropylene (PP) content in compression moldable thermoplastics that specifically include compression moldable long fiber thermoplastic (LFTD). The introduction of recycled and renewable content in the place of polypropylene, reduces the use of the higher cost polypropylene, and helps to reduce potential pollution that may be released to the environment during the production of polypropylene. A reduced environmental footprint for the present invention is noted, compared to conventional materials.

Recycled materials that may be substituted for polypropylene include transfer film that is a byproduct of the production of sheet molding compound (SMC), herein referred to as "recycled SMC film." The recycled SMC film is itself formed with polypropylene, thereby adding an additional source of polypropylene to a compression moldable thermoplastic material, while saving the need to produce additional polypropylene and the discard of recycled SMC film. Preferably, the recycled material has a polypropylene content of at least 35% weight percent.

Cellulosic powder fillers are introduced into compression moldable thermoplastic materials in some embodiments of the present invention as a substitute for polypropylene content in the base formulation. Such cellulosic natural fillers operative herein illustratively include coconut shell powder; treenut shell powder; peanut shell; grains hull and husks such as rice, wheat, and coconut husk fiber.

Cellulosic fibers may be introduced into compression moldable thermoplastic materials in some embodiments of the present invention as a substitute for polypropylene content in the base formulation. Cellulosic natural fibers operative herein illustratively include coconut fibers, bamboo fibers, sugar cane fibers, banana skin fibers, hemp, cane, jute, silk, and coconut husk.

Figure 1:
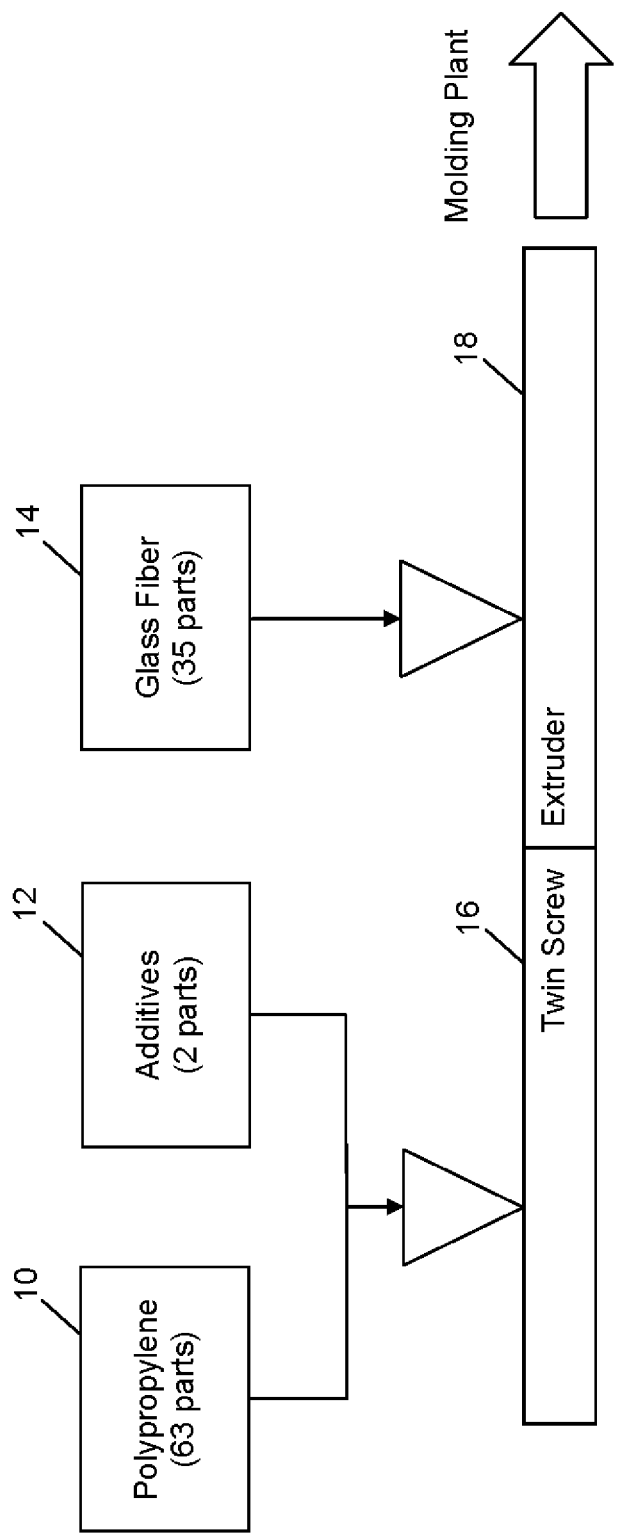
FIG. 1 is a block diagram of a prior art formulation and process for compression moldable long fiber thermoplastics formed with primarily with polypropylene and glass fiber.

Referring now to FIG. 1, a block diagram is shown of a typical prior art formulation and prior art process for compression moldable long fiber thermoplastics formed with primarily with polypropylene 10 and glass fiber 14. In the standard formulation of FIG. 1, the polypropylene 10 and additives 12 are mixed and compounded in the twin-screw extruder 16, and then combined with glass fiber 14 in extruder 18. The prior art conventional formulation for the compression moldable long fiber thermoplastic (LFTD) of FIG. 1 is a majority of polypropylene 10 at a given loading such as 45 to 80 parts, and in exemplary as shown in FIG. 1 of 63 parts of the total thermoplastic composition. Glass fiber 14 is provided at a loading of typically between 10 and 40 parts to impart strength to the resultant article. As provided in FIG. 1, the glass fiber 14 is present at 35 parts. A small amount of additives 12 are optionally provided to control material properties of the polypropylene. The additives 12 are provided at a loading of typically between 0 and 10 parts. Typical additives to unmodified PP include antacids such as calcium stearate, calcium pelargonate, zinc oxide or hydrocalcite. These compounds serve to neutralize catalyst residues that could otherwise form acids that can corrode processing equipment. Antioxidants are also conventionally present in PP to protect the polymer from chain scission during processing and ageing. Representative antioxidants are hindered phenols. Still other additives include clarifiers, flame retardants, UV stabilizers, antistatic agents, arbon black, slip agents and plasticizers. With the exception of the carbon black at more than 2% level, most conventional additives are utilized at low levels of below 1% and in many instances less than 0.01%. As provided in FIG. 1, the additives 12 are present at 2 parts. The typical and preferred prior art formulations are provided in Table 1 below:

TABLE 1

Conventional PP Compression Molding Composition

| Material | Typical amount in parts by weight | Exemplary amount in parts by weight in FIG. 1 |
| --- | --- | --- |
| Polypropylene | 45-80 | 63 |
| Additives | 0-10 | 2 |
| Glass Fiber | 10-40 | 35 |

It is to be understood that in instances where a range of values are provided with respect to the present invention, that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Figure 2:
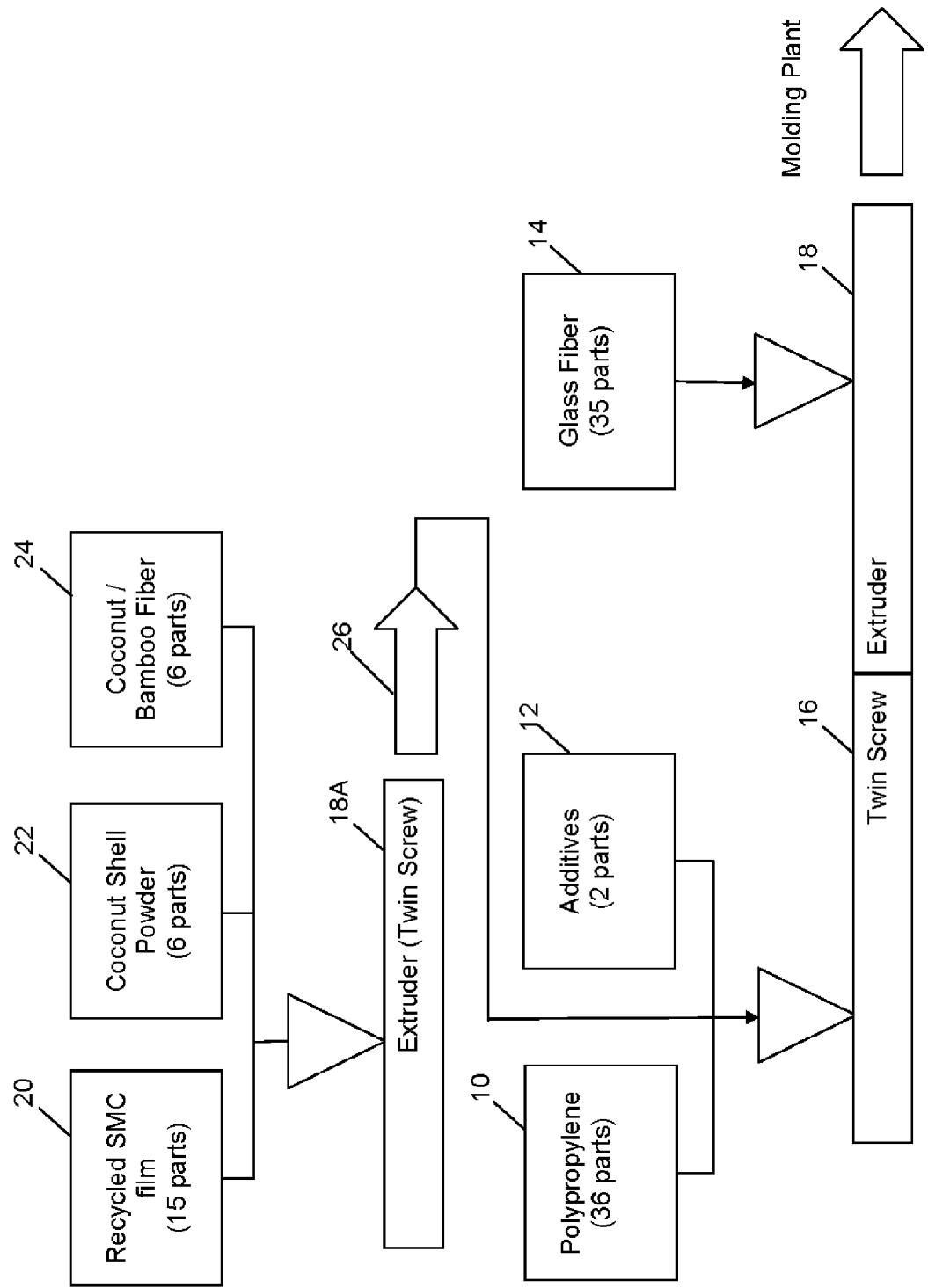
FIG. 2 is a block diagram of an inventive formulation and process for compression moldable long fiber thermoplastics formed with a portion of the polypropylene replaced with recycled and renewable content.

FIG. 2 is a block diagram of an inventive formulation and process for a compression moldable long fiber thermoplastics formed with a portion of the polypropylene 10 replaced with recycled and renewable content. In FIG. 2 recycled and renewable content includes recycled sheet molding composition (SMC) PP transfer film 20 at a loading of typically between 1 and 25 parts by weight. The film 20 has a thickness of between 0.5 and 1.5 mils and is a byproduct of SMC production used as a carrier and styrene barrier for an SMC resin paste through processing and is then conventionally discarded. The film 20 is shredded into a variety of shapes including strips with a length to width aspect ratio of 2-1000:1, or polygonal shapes such as rectilinear shapes, hexagons, circles, triangles, or combinations thereof that have aspect ratios of between 1-2:1 between a longest linear dimension and a shortest linear dimension. To facilitate mixing, the film 20 is typically provided at size that is within an order of magnitude (10% to 1000%) of the polypropylene feedstock pellets. As provided in FIG. 2, the film 20 is illustrated as being present at 15 parts by weight as an exemplary loading.

Cellulosic powder 22 is provided at a loading of typically between 0 and 15 parts by weight. As provided in FIG. 2, the cellulosic powder 22 is illustrated as being present at 6 parts by weight as an exemplary loading. The powder 22 is illustratively coconut shell powder; rice hull; wheat hull; nut shell powders of almond, hazelnut, walnut, pistachio, pinenut, pecan; cottonseed hulls; kenaf flour; olive stone; or a combination thereof. Typical powder sizes are between 2 and 1000 microns. The powder 22 is dried and operative without surface modification to render the powder surface hydrophobic. In other inventive embodiments, the PP is maleated to promotes covalent bonding between the PP and powder 22, or the powder 22 is modified through formation of urethane links or the link to provide a hydrophobic surface to the powder 22.

Cellulosic fiber 24 is also provided at a loading of typically between 0 and 15 parts by weight. As provided in FIG. 2, the cellulosic fiber 24 is illustrated as being present at 6 parts by weight as an exemplary loading. The fiber 24 is illustratively cellulose fiber, wood fiber, flax, hemp, sisal, coconut fiber, kenaf, bamboo fiber, date palm fiber, sugarcane fiber, banana skin fiber, or a combination thereof. In certain inventive embodiments, the cellulosic fiber 24 is coconut and/or bamboo fiber. Typical natural fiber diameters are between 10 and 500 microns. The length of fibers 24 in some embodiments are selected to have an average length that are with an order of magnitude (10% to 1000%) of the length of the glass strands that are present in an article. At least one of the cellulosic powder 22 and the cellulosic fiber 24 is present in an inventive formulation. Preferably, both the cellulosic powder 22 and the cellulosic fiber 24 are present in an inventive composition. More preferably, the cellulosic powder 22 and the cellulosic fiber 24 are each independently present in amounts of between 3 and 10 parts by weight.

The fiber 24 is mixed and compounded in extruder 18A to form a substitute composition 26. The extruder 18A is depicted as a twin screw extrude, yet it is appreciated that an otherwise conventional extruder such as a single screw or a double screw extruder that provides a degree of homogeneity is controlled through manipulation of extruder operating parameters. Without intending to be bound to a particular theory, the film 20 is believed to encapsulate the filler powder 22 and filler fiber 24, as present to address the prior art problem of hydrophilic fillers having weak interfacial interaction with a PP matrix. Residual SMC paste materials associated with the film 20 promote the encapsulation. The resultant substitute composition 26 is subsequently combined with polypropylene 10 and PP processing additives 12 to form a homogeneous composition with resort to extruder 16. Extruder 18 combines the glass fiber 14 with the other components to form the inventive LFTD for molding and further processing. Further processing preferably includes compression molding to form an article in a mold. Exemplary loadings of various components are depicted in FIG. 2. It is appreciated that the glass fiber 14 can be in numerous forms illustratively including chopped fibers, roving, and mats.

With usage of substitute composition 26 formed from recycled and renewable content allows for a reduction in the amount of virgin polypropylene 10 in the inventive LFTD versus the traditional LFTD of FIG. 1. Through control of the substitute composition 26 properties, an LFTD article is formed with physical properties similar to those of a traditional LFTD, yet with a reduction in virgin PP usage of between 20 and 65%. Similar reductions in additives are also obtained. A reduction in PP usage of 57% is noted for the exemplary quantities detailed between FIGS. 1 and 2. In a full-formulated inventive composition, 30 to 40 percent of the formulation is conventional PP and the polypropylene substitute represents up to 25, and even up to 30 total weight percent of the formulation, with the remainder being PP processing additives and glass fiber.

The inventive composition is provided in Table 2 relative to the conventional composition of Table 1.

TABLE 2

Typically values for an inventive composition.

| Material | Amount in weight percent | Typical amount in parts by weight | Exemplary amount in parts by weight in FIG. 2 |
|---|---|---|---|
| Polypropylene | 35-80% of Table 1 amount | 25-70 | 36 |
| Additives | 0% to 100% of Table 1 amount | 0-2 | 2 |
| Glass Fiber | 15% to 50% of Table 1 amount | 5-50 | 35 |
| Recycled SMC Transfer Film | 1% to 35% | 1-25 | 15 |
| Cellulosic Powder | 0% to 25% | 0-15 | 6 |
| Cellulosic Fiber | 0% to 25% | 0-15 | 6 |

It is noted that the formulation percentages of the separate components of the inventive LFTD may be varied in different embodiment in accordance with an intended application for the LFTD.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A molding composition comprising:
   polypropylene;
   glass fiber; and
   a polypropylene substitute comprising recycled sheet molding composition transfer film, said recycled sheet molding composition transfer film present at a loading of between 1 and 35 weight percent of the molding composition, said recycled sheet molding composition polypropylene transfer film being a byproduct of sheet molding composition production used as a carrier and a styrene barrier for a sheet molding composition resin paste and residual sheet molding composition resin paste materials, said polypropylene substitute being shredded into a variety of shapes including strips with a length to width aspect ratio of 2-1000:1, or polygonal shapes having aspect ratios of between 1-2:1 between a longest linear dimension and a shortest linear dimension before being homogenized with said polypropylene and said glass fiber in an extruder.

2. The molding composition of claim 1 wherein said polypropylene substitute further comprises a natural cellulosic filler of at least one of a natural cellulosic fiber or a natural cellulosic powder combined with said recycled sheet molding composition transfer film.

3. The molding composition of claim 2 wherein said natural cellulosic powder is selected from the group consisting of coconut shell powder, walnut shell powder, and rice hull.

4. The molding composition of claim 2 wherein said at least one natural cellulosic fiber is selected from the group consisting of coconut fibers, bamboo fibers, sugar cane fibers, and banana skin fibers.

5. The molding composition of claim 1 wherein said composition is a compression moldable long fiber thermoplastic (LFTD).

6. The molding composition of claim 1 wherein the proportion of said polypropylene is 30 to 40 total weight percent of said molding composition and said polypropylene substitute is 25 to 30 total weight percent of said molding composition.

7. A process for producing a molding composition of claim 1 comprising:
   mixing recycled sheet molding composition transfer film to form a polypropylene substitute composition; and
   combining said polypropylene substitute composition with polypropylene, one or more additives, and glass fiber.

8. The process of claim 7 wherein said mixing is done with a twin-screw extruder.

9. The process of claim 7 wherein said polypropylene substitute composition further comprises a natural cellulosic filler of at least one of a natural cellulosic fiber or a natural cellulosic powder combined with said recycled sheet molding composition transfer film.

10. The process of claim 9 where said natural cellulosic filler is said natural cellulosic powder, said natural cellulosic powder is at least one of coconut shell powder, walnut shell powder, or rice hull.

11. The process of claim 7 wherein said natural cellulosic filler is said natural cellulosic fiber.

12. The process of claim 11 wherein said natural cellulosic fiber is at least one of coconut fibers, bamboo fibers, sugar cane fibers, or banana skin fibers.

13. The process of claim 7 further comprising subjecting said molding composition to long fiber thermoplastic (LFTD) compression molding.

* * * * *